United States Patent [19]

Scheuerer

[11] Patent Number: 5,072,093

[45] Date of Patent: Dec. 10, 1991

[54] STEERING WHEEL WITH ELECTRIC HEATING AND PROCESS FOR ITS MANUFACTURE

[76] Inventor: Michael Scheuerer, Spielgartenweg 14, D-8075 Vohburg, Fed. Rep. of Germany

[21] Appl. No.: 464,542

[22] Filed: Jan. 16, 1990

[30] Foreign Application Priority Data

Mar. 2, 1989 [DE] Fed. Rep. of Germany ....... 3906576

[51] Int. Cl.[5] .............................................. B60L 1/02
[52] U.S. Cl. .................................. 219/204; 219/202; 219/200; 219/549
[58] Field of Search ............... 219/204, 200, 201, 202, 219/548, 549, 553

[56] References Cited

U.S. PATENT DOCUMENTS

| | | | |
|---|---|---|---|
| 1,117,473 | 11/1914 | Barton | 219/204 |
| 1,934,988 | 11/1933 | May . | |
| 2,392,539 | 1/1946 | Leible | 219/204 |
| 2,662,961 | 12/1953 | Sargent | 219/204 |
| 2,835,777 | 5/1958 | Gates | 219/19 |
| 4,194,536 | 3/1980 | Stine et al. | 138/149 |
| 4,783,586 | 11/1988 | Takeda | 219/544 |

FOREIGN PATENT DOCUMENTS

| | | |
|---|---|---|
| 271930 | 6/1988 | European Pat. Off. . |
| 3139410 | 4/1983 | Fed. Rep. of Germany . |
| 3343835 | 6/1985 | Fed. Rep. of Germany . |
| 8705717 | 10/1987 | Fed. Rep. of Germany . |
| 8708803 | 10/1987 | Fed. Rep. of Germany . |
| 2023038 | 8/1970 | France . |
| 59-267222 | 7/1986 | Japan . |
| 2065430 | 6/1981 | United Kingdom . |

OTHER PUBLICATIONS

Revue Automobile Feb. 24, 1989, Band 84, No. 8, p. 13, Trois Trouvailles Pour Ameliorer Le Confort El La Securite.

Primary Examiner—Bruce A. Reynolds
Assistant Examiner—Tu Hoang
Attorney, Agent, or Firm—Cort Flint

[57] ABSTRACT

The instant invention relates to a steering wheel with electric heating and to a process for its manufacture. In a first embodiment of the invention a heating conductor made of spring steel (7) is used and is imbedded in an outer zone of the steering wheel sheath with spring force directed outwardly and which is wound so that it provides interconnected, clamp-like open windings (8). This configuration of the spring wire (7) causes it to adhere to the inside of the torus-shaped foaming ring (5) during the foaming process in manufacture, so that it is thereby held in the desired position and need not be slung around the steering wheel core (6) with individual windings. In a further embodiment of the invention the heating conductor is formed so that the sheath consists of foaming material into which the appropriate amount of conductive particles is incorporated.

15 Claims, 2 Drawing Sheets

STEERING WHEEL WITH ELECTRIC HEATING AND PROCESS FOR ITS MANUFACTURE

The invention relates to a steering wheel for a motor vehicle with electrical heating and a process for its manufacture.

Known steering wheels consist of a steering wheel collar, spokes and a hub. The steering wheel collar contains a steering wheel core made of solid materials such as steel, aluminum or plastic and is normally surrounded by a sheath. Such sheaths can be produced by injection molding or reactive-injection molding by means of a foaming process, or out of wood or other materials. Such a sheath may be covered in addition with a leather cover.

The known sheaths adjust to the prevailing environmental temperature and are unpleasantly cold to the touch when temperatures are low and generally warm up slowly. In addition to this poor comfort at low temperatures it is also be noted that such sheaths become more brittle in the cold, and that their shock absorbing qualities at body impact in case of an accident are reduced, so that the overall vehicle safety is reduced.

In order to bring about an improvement in this, electrically heatable steering wheels have already been proposed (DE-OS 33 43 835 or U.S. Pat. No. 1,934,988). One of the problems with such electrically heatable steering wheels is to find an economic manufacturing method which is determined in particular by the installation of the heating conductors. The normally proposed wrapping of the steering wheel core with a heating wire is obviously costly, time consuming and can be automated only at considerable cost. In the case of proposals of having a heating wire run along the circumference of the steering wheel, too little heating wire is available for good heating conditions and the heating energy is distributed over an insufficient surface. Furthermore, there is always the disadvantage that the heating wire is attached to the steering wheel core and thereby lies normally far away from the outermost grasped surface which is to be heated. In this way the normally highly conductive steering wheel core is heated first and the heating performance outward is either very low to begin with, or the heat is propagated with great delay.

Furthermore an electrically heatable steering wheel is known (DE-OS 31 39 410, FIG. 3) in which a heating wire is applied in a wavy pattern together with juxtaposed open windings against the inner body of the steering wheel and is surrounded by a protective cover. The heating wire is here applied only in a wavy pattern in wide loops. When the inner body of the steering wheel, i.e. the heating wire is surrounded with the outer sheath, this produces the difficult task of holding the heating wire in place against the inner body of the steering wheel during this process and to immobilize it there. Because of the wide loops too little heating wire is provided here too for good heating conditions and the heat energy is not sufficiently distributed over the surface.

It is an object of the instant invention to create a steering wheel that is highly functional and economical in manufacture, with electric heating and a process for its manufacture.

SUMMARY OF THE INVENTION

The above objectives are accomplished according to the invention by providing a steering wheel which contains a steering wheel core of the steering wheel collar surrounded with a sheath made of foaming material and containing the electric heating conductors. It is possible to connect the heating conductors to the power supply of the motor vehicle. According to the invention, a heating conductor consisting of an electrically conductive spring wire with a certain resistance is provided. The spring wire is imbedded below the circumferential surface near the edge of the sheath and has juxtaposed, clamp-like open windings. The spring force of the windings is directed to the outside. The spring wire is wound in such manner that one end of a wire clamp or open wire winding is connected to the adjoining end of the next wire clamp and so that the other end of the wire clamp is connected to the adjoining end of the next previous wire clamp, etc. Each end of the spring wire can be connected to a pole of the power plant. In such a steering wheel the heating wire lies directly beneath the surface, where the heat is to be produced to warm up rapidly and efficiently. The special additional advantages of such an embodiment are to be found in the manufacture, as is explained in the context of additional processes.

The spring wire is advantageously produced so as to be electrically insulated, with a covering, in order to avoid short circuits among the heating wire windings as well as possibly to the steering wheel core. Since the heating wire comes to lie far radially outwards, because of its spring properties, and may possibly no longer be sheathed, the insulation cover prevents bare wire from being visible. This embodiment is especially well suited for the leather covering of the sheath.

The spring wire should have a diameter that is slightly greater than the cross-sectional diameter of the sheath, so that the spring action is directed to the outside in the built-in wire, representing a simplification for the manufacturing process as will be shown further below. The diameter in that case is in form of a circle open on one side which is suitably buckled into an elliptic form before installation.

In order to achieve rapid warming of the steering wheel it is desirable to operate the heating system at relatively high capacity. However, this produces too high a temperature on the steering wheel in a subsequent continuous operation. The invention provides the installation of a thermostat for temperature regulation in the sheath. This thermostat action can also be achieved, with the proper selection of the heating spring wire, in that a so-called thermo-wire is used. The resistance of the thermo-wire changes together with temperature changes, and which therefore carries out temperature regulation autonomously.

According to a process of manufacture, first, the steering wheel core is imbedded in a divided foam form, is supported via its hub area, and is centered and held in the torus-shaped ring of the foam form for sheathing. In a second process step, the spring wire with its above-described winding is laid into the lower part of the form. Due to the fact that its winding diameter is greater than the torus cross-section, the spring wire already adheres under tension to the inner surface of the lower part of the foam form. In the third process step the foam form is closed, so that the spring wire is put under tension from the outside and thereby adheres in its entirety to the inside of the foam form and at least partially bears upon same. In the fourth process step the foam form is filled with foam. Finally, the foam-covered steering wheel is taken out and, if applicable, is then covered with leather. The two open ends of the spring wire are here brought out of the sheath and are provided through known measures, e.g. by means of a slip ring in the steering wheel hub, with means for electrical connection to power plant. In the process, use of a sheath made of PU (polyurethane) foam and an electric insulation of the spring wire with rubber insulation have proven to be especially suitable. The rubber insulation is able to withstand relatively high temperatures so that these do not reach the PU foam directly and thus do not harden it excessively.

In another embodiment of the invention, the electric heating conductor contained in the foam sheath consists of conductive particles distributed continuously in the foaming material. Obviously an electrically conductive steering wheel core must here be electrically insulated from such an internally conductive sheath. Such an electric insulation can at the same time contain a heat barrier against the steering wheel core. The embodiment elegantly solves the problem of attaching a heating conductor in the sheath, as the heating conductor is produced practically together with the foaming process in one work step, without any additional expenditure. The conductive particles can be contained in the foaming material in form of powder, fiber or granulates of metal, in particular aluminum, or coal or other conductive materials. The sizing, i.e. the ratio of quantities to volume between foaming material and conductive particle material shall be selected here so that a predetermined heating performance, i.e. comfortable warmth is reached within a short period of time.

In order to bring electrical energy to the sheath which is itself made as a heat conductor, a blank conductor wire is incorporated in the sheath for the positive connection and one for the negative connection, as the sheath is filled with foam. It is then possible to connect the free ends of the conductor wires going to the outside. This second embodiment is suitable for the mass production of steering wheels without additional covering. This embodiment is especially advantageous with an additional wood covering. This is indicated in the process in which the foam form consists directly of two hollow wooden forms surrounding the steering wheel at a distance. The interval thus created is directly filled with the foaming material and the conductive particles contained therein, with simultaneous incorporation of the conductor wires. The realization of this process is simple and economic. Here too, PU foam is suitably used as the foaming material.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
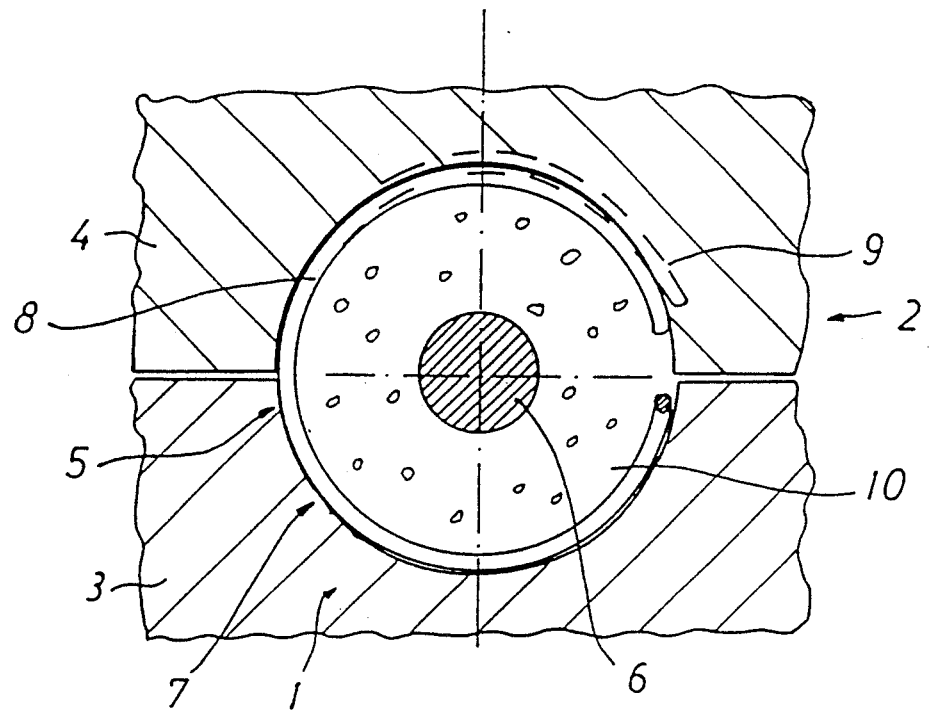
FIG. 1 illustrates a sectional view through a foam form into which a steering wheel collar is incorporated with the foam, together with an applied spring wire serving as a heating conductor.

Referring now in more detail to the drawings, FIG. 1 shows a cross-section through a steering wheel collar which is made in a foam form 2. Foam form 2 is made of a lower, fixed form element 3 and an upper, hinged form element 4. Both form elements are provided with ring-shaped, semi-cylindrical grooves which constitute the torus-shaped ring 5 corresponding to the form of the steering wheel collar 1 when the form elements 3, 4 have been closed. In order to introduce the foaming material into the ring 5, feeding channels (not shown) are provided in the foam form 2.

A metallic, ring-shaped steering wheel core 6 is laid into the lower form element 3 before the introduction of foam, and is held by the steering hub to the center (not shown) of the foam form 2 and is centered at a distance in the middle area of ring 5.

Figure 2:
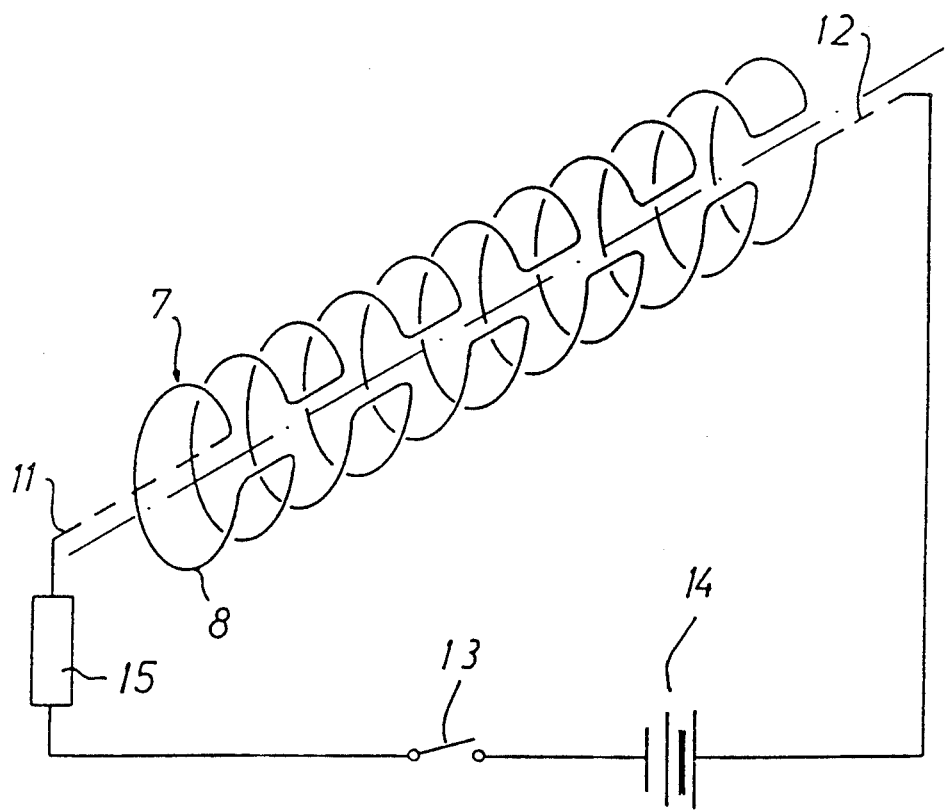
FIG. 2 illustrates the manner in which the spring wire is wound.

FIG. 2 shows a schematic representation, in perspective, of a spring wire 7 which is laid into the foam form 2 before the foaming process, to serve as an electric heating wire. The spring wire is wound so that each winding becomes a kind of wire clamp open on one side, which is continuously linked to the adjoining wire clamp in an endless linkage. This results in an overall spring wire configuration of wire bent in a coherent manner, but which is open on one side over its entire length.

Figure 3:
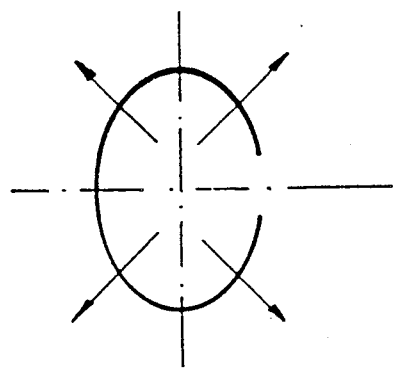
FIG. 3 illustrates a view of the spring wire in axial direction.

The spring wire 7 can thus be pushed with its one-sided opening over the steering wheel core 6 and can be laid into the lower form element 3, to begin with. The diameter of a spring clamp 8 is here made somewhat greater than the diameter of the ring 5. It has also been shown to be advantageous to give each spring clamp a slightly buckled, oval form as shown in FIG. 3, exaggerated for the sake of clarity.

When the upper form element 4 is closed the spring wire 7, i.e. each wire clamp 8, is compressed radially because of its diameter being greater than the ring diameter, so that a spring force is exerted against the inner surface of the ring 5 and causes the spring wire 7 to adhere to it and bear on it. The position of a non-tensed spring clamp 8 before installation of the upper form element 4 is indicated by a broken line under reference 9.

Once the spring wire 7 has been installed in this manner and the form element 4 has been closed, the ring 5 can be filled with foam, preferably PU foam 10 to form a sheath around the core.

Due to the nature and the manner of its installation, the spring wire 7 is thus automatically fixedly installed for the foaming process in an outer region of the ring 5, where a heating effect is to occur. Expensive winding of the steering wheel core 6 by means of individual, continuous wire windings is thus avoided. The spring wire 7 is preferably surrounded by electric insulation.

The free ends 11 and 12 of the spring wire 7 are brought out of the ring area 5 and can be connected via a switch 13 to an electric circuit via an energy supply installation 14 of a vehicle. A thermostat, schematically indicated with the reference number 15, is preferably installed in an area of the spring wire 7 and incorporated into the steering wheel collar, so that the heating temperature occurring in the steering wheel may be controlled.

Figure 4:
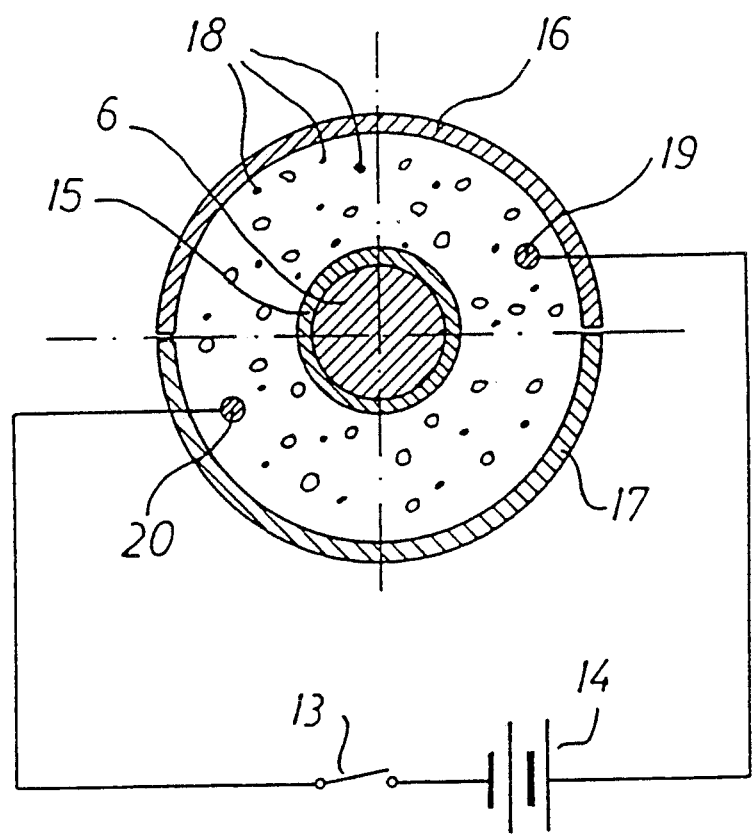
FIG. 4 illustrates a sectional view through the steering wheel collar of a second embodiment of a steering wheel with a wood covering.

FIG. 4 shows a section through a second embodiment of the steering wheel collar. Here too a steering wheel core 6 is shown, which however is in this case is electrically and at the same time thermally, if necessary, insulated by means of an insulation layer 15. The outer covering of the steering wheel collar consists here of hollow half forms 16 and 17 made of laminated wood. The space between the steering wheel core 6 or the insulation layer 15 and the insides of the closed hollow forms 16, 17 is filled with foam. For the foaming process, the hollow half forms 16, 17 can be installed in a manner similar to that shown in FIG. 1.

The foaming material contains conductive particles 18 in this embodiment, which are continuously distributed in the foaming material and are contained therein in such quantity that a desired electric conductivity and heating capacity is achieved. Two blank conductor wires 19, 20 are incorporated in the foaming process and lead to the outside for the connection to the heating circuit so that current may be brought into the foaming material with the conductive particle. Each of wires 19, 20 are also capable of being connected via a switch 13 to a pole of a power plant of a vehicle.

In conclusion it should be stated that the invention serves to produce a properly functioning, electrically heated steering wheel which is furthermore economic in manufacture.

While a preferred embodiment of the invention has been described using specific terms, such description is for illustrative purposes only, and it is to be understood that changes and variations may be made without departing from the spirit or scope of the following claims.

What is claimed is:

1. A steering wheel for a motor vehicle with electrical heating of the type which includes an annular steering wheel collar having an interior core surrounded by a sheath, at least one electrical heating conductor incorporated into the sheath connectable to a power supply of the motor vehicle, wherein said steering wheel comprises:
   an electrical heating conductor which includes an electrically conductive spring wire having a prescribed resistance;
   said spring wire being imbedded beneath the circumferential surface of said collar in an outer radial zone of said sheath;
   said spring wire having a plurality of juxtaposed, open wire clamps defined by a series of clamp-like open windings with a spring force directed in a radially outward direction toward said circumferential surface of said collar;
   said spring wire wound so that one end of an open wire clamp is connected to an end of a next open wire clamp and an opposite end of the wire clamp is connected to an end of a previous open wire clamp; and
   said spring wire having a pair of free ends connectable to a power supply of said vehicle.

2. The device of claim 1 wherein said spring wire is electrically insulated.

3. The device of claim 1 wherein said spring wire has an unstressed configuration prior to installation in said sheath generally representing that of a circle having an opening on one side and having a diameter that is slightly greater than a cross-sectional diameter of said sheath.

4. The device of claim 1 including a thermostat disposed near said sheath operatively connected to said spring wire for temperature regulation.

5. The device of claim 1 wherein said spring wire includes a thermo-wire which automatically changes its electrical resistance for temperature regulation.

6. The device of claim 1 wherein said sheath is covered with leather.

7. A steering wheel for a motor vehicle with electrical heating of the type which comprises:
   a steering wheel collar having a core surrounded with a generally solid sheath;
   electrical heating means imbedded within said sheath including a pair of electrical conductor wires connectable externally of said sheath to a power supply of the vehicle;
   said electrical heating means further comprising a plurality of conductive particles distributed continuously within said sheath in electrical conductive relationship to said electrical conductor means; and
   means for electrically insulating said core from said conductive particles.

8. The device of claim 7 wherein said particles include metallic particles distributed in said sheath to provide a desired temperature.

9. The device of claim 7 wherein said electrical conductor wires includes a pair of electrical conductor wires imbedded in said sheath connectable to said power supply of said vehicle.

10. The device of claim 7 wherein said sheath consists of a foam sheath.

11. The device of claim 10 including a non-electrically conductive covering surrounding said sheath.

12. A process for the manufacture of a motor vehicle steering wheel having electrical heating comprising:
   supporting a steering wheel core in a divided form having first and second parts for forming said steering wheel wherein said core is generally centered and held in a torus-shaped ring defined within said first and second parts of the form for sheathing;
   laying a spring wire into said form;
   using a spring wire having a winding diameter which is greater than a diameter of a cross-section of said ring so that said spring wire readily contacts an interior surface of said form under tension;
   closing said first and second parts of said form so that said spring wire is placed under tension from the outside and adheres generally to said interior surface of said form; and
   filling said form with a material so that said wire spring is embedded within said material surrounding said core.

13. The process of claim 12 wherein said sheath is removed from said form and covered with leather material.

14. The process of claim 13 including covering said spring wire with a rubber insulation.

15. The process of claim 12 wherein said form is provided by two divided hollow wooden forms which are laid around an electrically insulated steering wheel core at a distance; and distance between said steering wheel core and the insides of said wooden forms if filled with a foaming material.

* * * * *